US009395432B2

(12) United States Patent
Boyd

(10) Patent No.: US 9,395,432 B2
(45) Date of Patent: Jul. 19, 2016

(54) METHOD AND APPARATUS FOR MODELING TIMING RELATIONSHIPS BETWEEN CLOCKS

(75) Inventor: Robert W. Boyd, Eidson, TN (US)

(73) Assignee: ZIH CORP., Lincolnshire, IL (US)

( * ) Notice: Subject to any disclaimer, the term of this patent is extended or adjusted under 35 U.S.C. 154(b) by 401 days.

(21) Appl. No.: 13/588,710

(22) Filed: Aug. 17, 2012

(65) Prior Publication Data

US 2013/0051262 A1 Feb. 28, 2013

Related U.S. Application Data

(60) Provisional application No. 61/524,569, filed on Aug. 17, 2011.

(51) Int. Cl.
*H04L 12/28* (2006.01)
*G01S 5/10* (2006.01)
*G01S 5/02* (2010.01)
*H04J 1/16* (2006.01)

(52) U.S. Cl.
CPC . *G01S 5/10* (2013.01); *G01S 5/021* (2013.01); *G01S 5/0221* (2013.01)

(58) Field of Classification Search
CPC .................................................. H01J 3/0667
USPC ........................................ 370/252, 329, 503
See application file for complete search history.

(56) References Cited

U.S. PATENT DOCUMENTS 6,324,586 B1 * 11/2001 Johnson ........................ 709/248
7,710,322 B1 * 5/2010 Ameti et al. .................. 342/465
2002/0009168 A1 * 1/2002 Dick et al. .................... 375/356
2004/0179483 A1 * 9/2004 Perlow et al. ................ 370/278
2005/0169193 A1 * 8/2005 Black et al. .................. 370/254
2005/0193149 A1 * 9/2005 Boyd ............................ 709/248
2007/0230269 A1 * 10/2007 Ledeczi ................ G01S 5/0081 367/117
2008/0012767 A1 1/2008 Caliri et al.
2008/0049753 A1 * 2/2008 Heinze ................ H04L 12/5695 370/392
2008/0291883 A1 * 11/2008 Seok ............................ 370/338
2009/0231198 A1 9/2009 Walsh et al.

(Continued)

FOREIGN PATENT DOCUMENTS

WO WO 2005/047926 A1 5/2005
WO WO 2005047926 A1 * 5/2005

OTHER PUBLICATIONS

Mills,"Network Time Protocol (NTP)" Sep. 1985, Internet Engineering Task Force, Request for Comments: 958.*

(Continued)

*Primary Examiner* — John Pezzlo

(57) ABSTRACT

Various methods for modeling timing relationships between clocks are provided. One example method includes identifying a link that is one of a plurality of links within a wireless locating system and receiving link data describing a reference signal event for the link. The example method may also include determining a reliability metric for the link based on the link data and comparing the reliability metric to a threshold reliability metric to determine whether the link is a reliable link. Further, the example method may include adding the link to a collection of reliable links for the wireless locating system, and generating a model describing a timing relationship between respective clocks of each of a plurality of receiver units in the wireless locating system based on link data for each of the reliable links. Related systems and apparatuses are also provided.

35 Claims, 5 Drawing Sheets

Identifying a link that is one of a plurality of links within the wireless locating system — 400

Receiving link data describing a reference signal event for the link — 410

Determining a reliability metric for the link based on the link data — 420

Comparing the reliability metric for the link to a threshold reliability metric to determine whether the link is a reliable link — 430

In an instance in which the link is determined to be a reliable link, including the link in a collection of reliable links for the wireless locating system — 440

Generating a model describing a timing relationship between respective clocks of each of a plurality of receiver units in the wireless locating system based on link data for each of the reliable links — 450

(56) References Cited

U.S. PATENT DOCUMENTS

| | | | | |
|---|---|---|---|---|
| 2010/0298001 | A1* | 11/2010 | Dimou et al. | 455/441 |
| 2011/0050501 | A1* | 3/2011 | Aljadeff | 342/387 |
| 2012/0207183 | A1* | 8/2012 | Bobrek et al. | 370/511 |

OTHER PUBLICATIONS

Mills,"Algorithms for Synchronizing Network Clocks" Sep. 1985, Internet Engineering Task Force, Request for Comments: 956.*

Marzullo , et al. Maintaining the Time in a Distributed System. ACM Operating Systems Review 19, 3 (Jul. 1985).*

National Institute of Standards and Technology (NIST), http://www.nist.gov/pml/div688/grp40/wwvb.cfm Created: Mar. 1, 2010, Updated: Jan. 8, 2014, Retrieved:Jul. 23, 2014.*

International Search Report and Written Opinion from International Application No. PCT/US2012/051385, mailed Nov. 15, 2012.

European Patent Office, "Communication pursuant to Article 94(3)" issued in connection with EP Patent Application No. 12762438.5 on May 31, 2016.

* cited by examiner

METHOD AND APPARATUS FOR MODELING TIMING RELATIONSHIPS BETWEEN CLOCKS

CROSS REFERENCE TO RELATED APPLICATIONS

This application claim priority from U.S. Provisional Application 61/524,569 filed on Aug. 17, 2011, the content of which is incorporated herein by reference in its entirety.

TECHNICAL FIELD

Embodiments of the present invention relate generally to clock correlation in a distributed system, and, more particularly, relate to a method and apparatus for modeling timing relationships between clocks within a wireless system.

BACKGROUND

An issue that can often arise with systems that are performing distributed timing analyses is the handling of discrepancies between the local clocks within each unit on a system. There are numerous applications where clock correlation between distributed units is either required or provides a substantial increase in the accuracy of results.

One example application where clock correlation is important is in wireless locating systems. A wireless locating system often includes a number of receiver units distributed within a tracking area, where each receiver unit may have an independent local clock. The receiver units may be configured to receive a wireless signal from a tag at an unknown location within the tracking area. Based on the timing of when the receiver units receive the signal from the tag, a locating analysis can be performed to determine the location of the tag. Determining precisely when a signal is received at each receiver unit and relating those times to each other is a key operation that is performed by the locating system. As such, discrepancies in the clocks of the receiver units can negatively impact the accuracy of a location determination, if left uncorrected. As such, being able to account for the discrepancies in the clocks of the various receivers is an important feature of an accurate locating system.

SUMMARY

Various methods for modeling timing relationships between clocks are provided herein. One example method includes identifying a link that is one of a plurality of links within a wireless locating system, where the link is defined by at least a reference signal source, a first receiver unit, and a second receiver unit. The example method may also include receiving link data describing a reference signal event for the link, where the link data for the reference signal event is defined by at least a first time stamp describing a time at which the first receiver unit received a reference signal transmitted by the reference signal source, and a second time stamp associated with the reference signal. Further, the example method may include determining a reliability metric for the link based on the link data, comparing the reliability metric for the link to a threshold reliability metric to determine whether the link is a reliable link, and, in an instance in which the link is determined to be a reliable link, including the link in a collection of reliable links for the wireless locating system. Further, the example method may include generating a model describing a timing relationship between respective clocks of each of a plurality of receiver units in the wireless locating system based on link data for each of the reliable links.

An example apparatus according to various example embodiments includes processing circuitry to perform various functionalities. In this regard, the processing circuitry may be configured to identify a link that is one of a plurality of links within a wireless locating system, where the link is defined by at least a reference signal source, a first receiver unit, and a second receiver unit. The processing circuitry may also be configured to receive link data describing a reference signal event for the link, where the link data for the reference signal event is defined by at least a first time stamp describing a time at which the first receiver unit received a reference signal transmitted by the reference signal source, and a second time stamp associated with the reference signal. Further, the processing circuitry may be configured to determine a reliability metric for the link based on the link data, compare the reliability metric for the link to a threshold reliability metric to determine whether the link is a reliable link, and, in an instance in which the link is determined to be a reliable link, include the link in a collection of reliable links for the wireless locating system. Further, the processing circuitry may be configured to generate a model describing a timing relationship between respective clocks of each of a plurality of receiver units in the wireless locating system based on link data for each of the reliable links.

Another example apparatus may include a computer readable medium, which may be non-transitory, having computer program code stored thereon. The computer program code may be configured to, when executed, cause an apparatus to identify a link that is one of a plurality of links within a wireless locating system, where the link is defined by at least a reference signal source, a first receiver unit, and a second receiver unit. The computer program code may also be configured to cause the apparatus to receive link data describing a reference signal event for the link, where the link data for the reference signal event is defined by at least a first time stamp describing a time at which the first receiver unit received a reference signal transmitted by the reference signal source, and a second time stamp associated with the reference signal. Further, the computer program code may be configured to cause the apparatus to determine a reliability metric for the link based on the link data, compare the reliability metric for the link to a threshold reliability metric to determine whether the link is a reliable link, and, in an instance in which the link is determined to be a reliable link, include the link in a collection of reliable links for the wireless locating system. Further, the computer program code may be configured to cause the apparatus to generate a model describing a timing relationship between respective clocks of each of a plurality of receiver units in the wireless locating system based on link data for each of the reliable links.

Yet another example apparatus is provided. The example apparatus may include means for identifying a link that is one of a plurality of links within a wireless locating system, where the link is defined by at least a reference signal source, a first receiver unit, and a second receiver unit. The example apparatus may also means for include receiving link data describing a reference signal event for the link, where the link data for the reference signal event is defined by at least a first time stamp describing a time at which the first receiver unit received a reference signal transmitted by the reference signal source, and a second time stamp associated with the reference signal. Further, the example apparatus may include means for determining a reliability metric for the link based on the link data, means for comparing the reliability metric for the link to a threshold reliability metric to determine whether the link is a reliable link, and means for including the link in a collection of reliable links for the wireless locating system in an instance in which the link is determined to be a reliable link. Further, the example apparatus may include means for generating a model describing a timing relationship between respective clocks of each of a plurality of receiver units in the wireless locating system based on link data for each of the reliable links.

BRIEF DESCRIPTION OF THE DRAWING(S)

Reference will now be made to the accompanying drawings, which are not necessarily drawn to scale, and wherein.

Figure 6B:
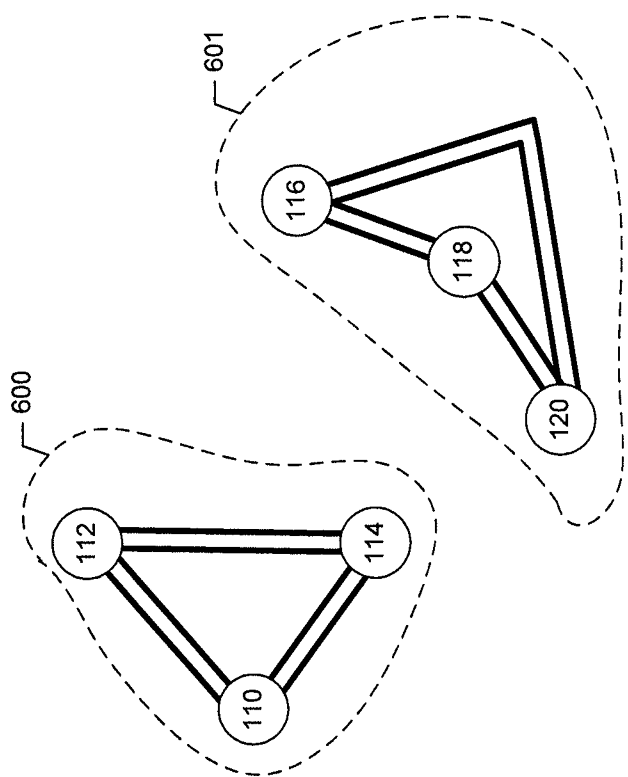
Figure 6A:
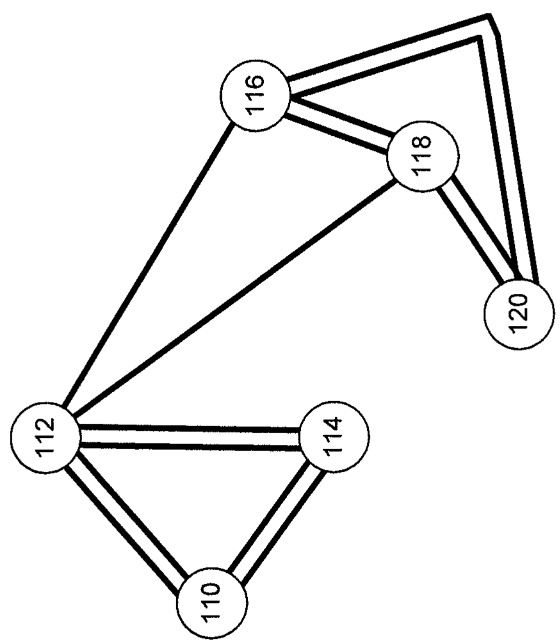
Figure 7:
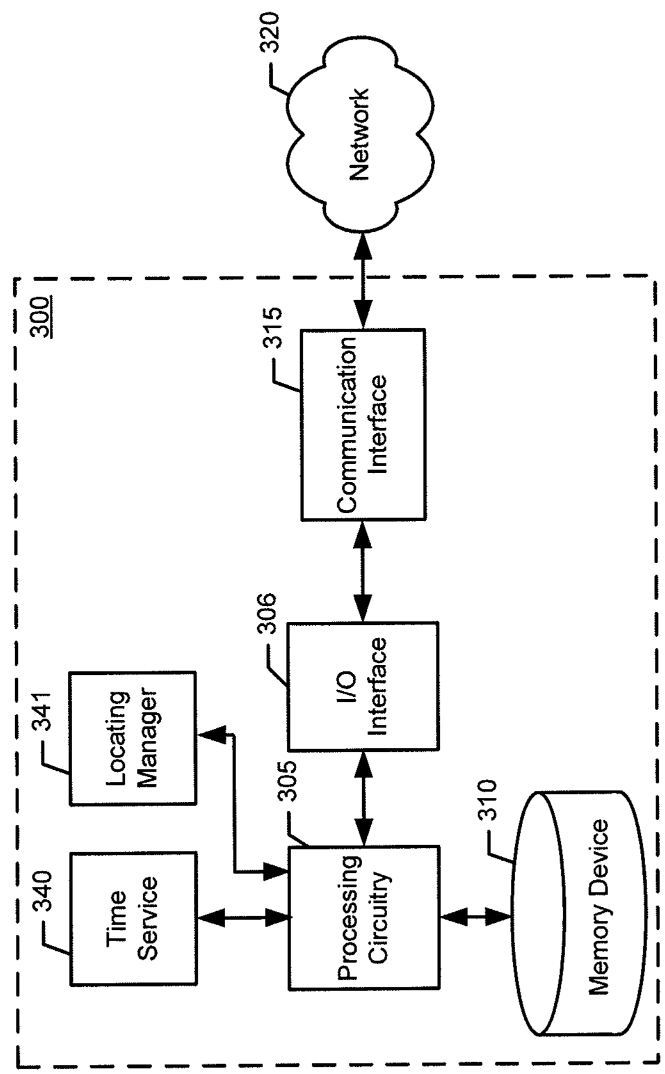
Figure 8:
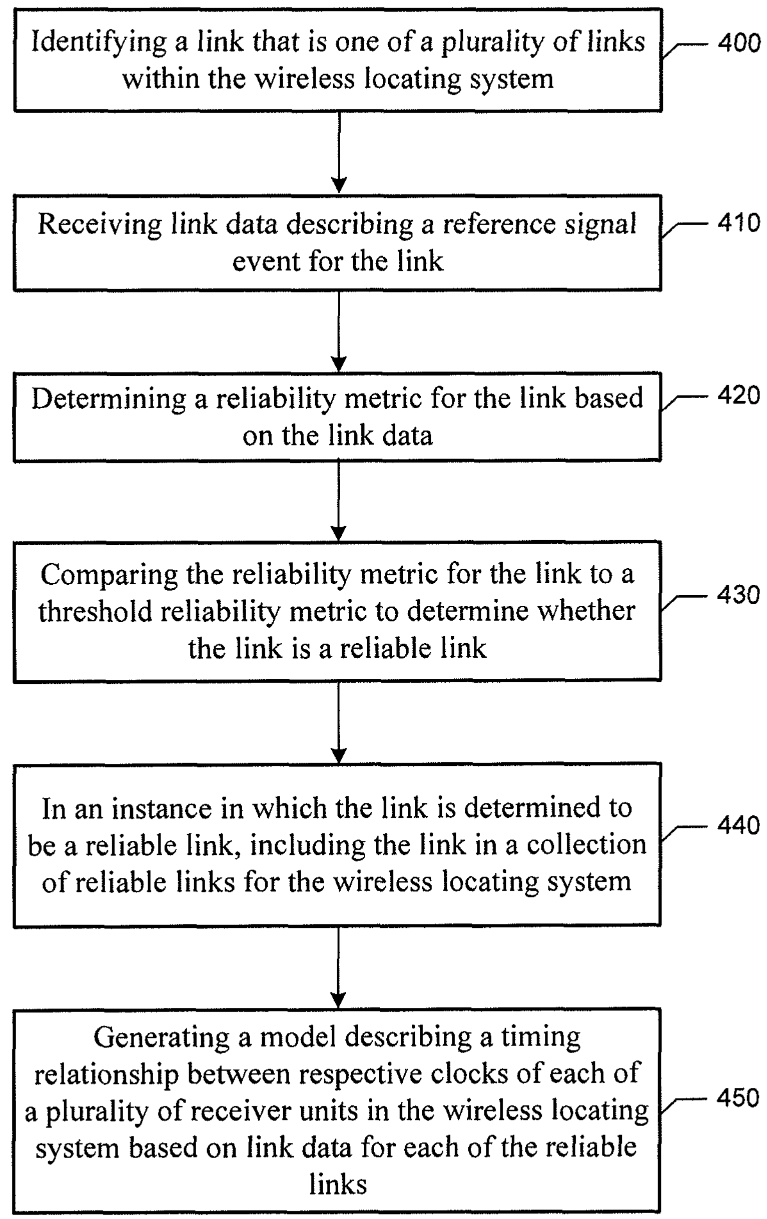

FIGS. 6*a* and 6*b* illustrate an example topography of a system according to an example embodiment of the present invention;

FIG. 7 illustrates an architecture of a centralized processing agent configured to model timing relationships between clocks according to another example embodiment of the present invention; and FIG. 8 illustrates a flowchart of an example method for modeling timing relationships between clocks according to an example embodiment of the present invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

According to various example embodiments, various methods and apparatuses for modeling timing relationships between distributed, independent clocks are provided. According to some example embodiments, the modeling of timing relationships between units in a distributed system may be leveraged in a variety of applications, including, for example, location systems. In this regard, a location system, such as the one described with respect to FIG. 1, may utilize determined timing relationships between the clocks of various entities in the system (e.g., receiver units) to correlate the clocks and determine a location of a signal source within the system. It is understood that the locating system described herein is but one application where various example embodiments may be utilized, and one of ordinary skill in the art would appreciate that various example embodiments may also or alternatively be applied in other types of systems that could benefit from correlating independent clocks.

Figure 1:
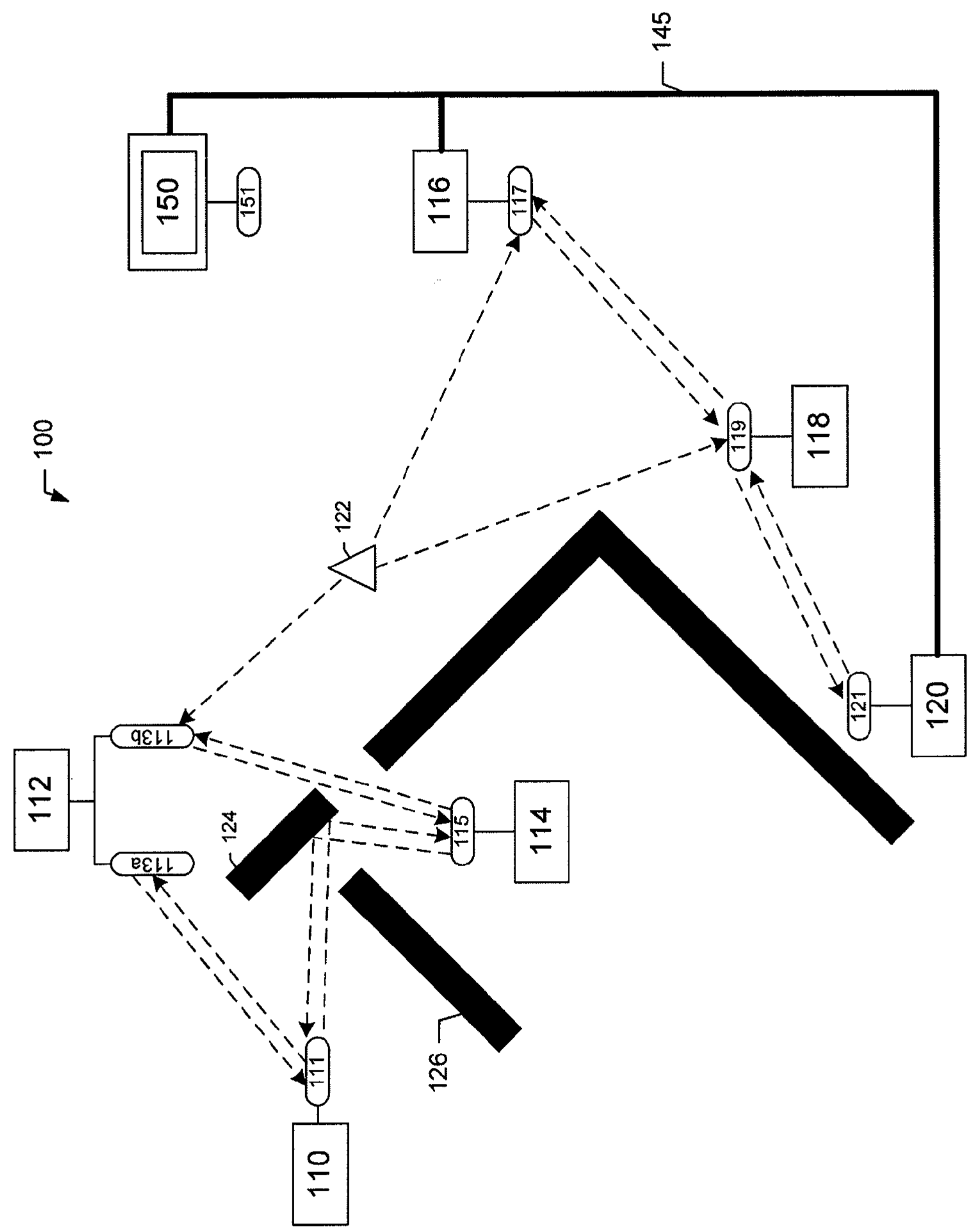
FIG. 1 illustrates an example locating system with multiple receiver units having independent clocks according to an example embodiment of the present invention.

FIG. 1 illustrates an example locating system 100 according to various example embodiments. The system 100 may include one or more receiver units (e.g., receiver units 110, 112, 114, 116, 118, and 120). Each receiver unit may include one for more antennas, which may be configured to support receiving and/or transmitting wireless signals. In this regard, receiver unit 110 includes antenna 111, receiver unit 112 includes antennas 113 a and 113 b, receiver unit 114 includes antenna 115, receiver unit 116 includes antenna 117, receiver unit 118 includes antenna 119, and receiver unit 120 includes antenna 121. Each receiver unit may also include a local clock, which may run independently from the respective clocks of the other receivers.

The system 100 may also include one or more reference tags, for example reference tag 122, which may be placed at known location. The system 100 may support communications between the receiver units and a location processing agent 150, which may also include an antenna 151 for communications and/or locating. The system 100 may be configured to support any known communication format or architecture and, in some example embodiments, the system 100 may be configured to support communications as a wireless area network (WLAN).

In some example embodiments, the system 100 may be dedicated to locating functionalities and may operate in the same space as a WLAN system, but the system 100 may additionally operate separate from the WLAN such that routing and other WLAN functionality is performed by separate WLAN hardware. The system 100 may be configured to perform functionality to locate the source of a wireless signal that is provided in accordance with any wireless communications standard. Wireless signaling within the system 100 may be conducted on one or more frequency or communication channels. As a more specific example, the system 100 may be configured to support signaling in accordance with ISO24730, IEEE 802.x (e.g., IEEE 802.11, IEEE 802.15, and the like), Zigbee, ultra wide-band (UWB), and signaling based on various other standards. In addition to active tag standards, passive RFID tag standards such as the UHF RFID standards as announced by EPCglobal Inc. and ISO/IEC, light-based standards such as IrDA, or other standard signaling protocols, proprietary, non-standards based communications may also be supported. In this regard, one or more mobile tags (not shown) may be present within a tracking area of the system 100, and these mobile tags may emit a wireless signal that the system may detect and locate.

The system 100 may operate as a system for locating tags or any type of signal source. To locate a signal source, the system 100 may be configured to support locating functionality based on, for example, time-of-arrival (ToA) and differential time-of-arrival (DToA) applications where a signal provided by a signal source is received by a plurality of the receiver units and information about receipt of the signal (e.g., the time-of-arrival and the data content) may be processed to identify the location of the signal source. Other techniques may additionally or alternatively be used, such as, for example, signal angle of arrival (AoA), signal magnitude as received channel power indication (RCPI) or received signal strength indication (RSSI), range to signal source such as time of flight (ToF), two way ranging (TWR), symmetrical double sided two way ranging (SDS-TWR) or near field electromagnetic ranging (NFER), or the like; possibly used in combination The receiver units of the system 100 may be configured to receive a signal and generate a time stamp indicating when that signal was received. In this regard, a receiver unit may include at least a radio frequency front end, processing circuitry, and a memory device to implement the functionality of the receiver units as described herein. According to some example embodiments, a receiver unit may be configured to measure a received signal's time-of-arrival relative to the receiver unit's internal clock. The time stamp may indicate a time-of-arrival for the signal at the antenna of the receiver unit. According to various example embodiments, the receiver units may account for any antenna delay in the receiver unit when generating the time stamp. The ability to time stamp the time-of-arrival of a wireless signal may be utilized for determining locations of signal sources, for determining a location, and for determining clock relationships between the respective clocks of the receiver units.

The receiver units may also be configured to transmit wireless signals from their respective antennas. In this regard, for the purpose of performing clock correlation between the receiver units, the receiver units may be configured to transmit reference signals. A reference signal may be a communication from a reference signal source that provides an identifier of the reference signal source device, and/or information describing a location of the reference signal source device. Since the location of the receiver units (or more specifically the location of the receiver units' antennas) may be known and/or because the time of transmission of a reference signal from the receiver may be known, the timing relationships between the clocks of the receiver units may be determined.

As such, the receiver units may be a source of a reference signal to be used for determining the timing relationships between the receiver units. Another device that may provide reference signals to be used to determining timing relationships between the clocks of the receivers is a reference tag, such as the reference tag 122. The reference tag 122 may be configured to transmit a reference signal to be received by the receiver units. The reference tag may be located (e.g., statically located) at a known position to permit the reference signal provided by the tag to be used for determining timing relationships between the clocks of the receivers.

Through the receipt and time stamping of reference signals, the system 100, and more particularly, the location processing agent 150, may be configured to generate a model that describes the timing relationships between the receiver unit clocks in the system. The location processing agent 150 may be a device, such as a server, that is configured to receive data about reference signals and generate the clock timing model. The location processing agent 150 may implement a time service that is configured to formulate the timing relationships between the clocks of the receiver units based on information about reference signals. The location processing agent 150 may also be configured to apply the generated model to time-of-arrival data captured by at least some of the receiver units to perform signal source locating of a source at an unknown location.

To determine the timing relationships between the clocks of the receiver units, the location processing agent 150 may be configured to analyze each of the "links" that are present within the system. A link can be defined by at least a reference signal source, a first receiver unit, and a second receiver unit. The first and second receiver units of a link may receive or have a time stamp for a reference signal provided by the reference signal source. Links may also be defined with respect to specific antennas of a receiver unit in situations where the receiver unit includes a plurality of antennas. To describe a link at any given time, link data may be captured during a reference signal event (i.e., the transmission of a reference signal). Link data may be originally captured at the receiver units and then forwarded to the location processing agent 150 for analysis. The location processing agent 150, via the time service, may be configured to repeatedly obtain link data for each available link over a period of time, and analyze the link data to determine timing relationships between the clocks. The timing relationships between the clocks of the receiver units may be described in terms of a difference in the rate of the clocks (i.e., differences in the speed of the clocks) and differences in a time offset between the clocks. FIGS. 2-5 illustrate various forms of links that may be considered when analyzing clock relationships within the system 100.

Figure 2:
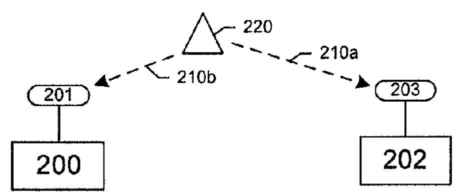
FIGS. 2-5 illustrates some of the various types of links that the may be used in accordance with an example embodiment of the present invention.

FIG. 2 illustrates a link that is based on a reference signal that is received at the antennas of two receiver units. In this regard, the reference tag 220 is configured to transmit a reference signal. The reference signal may be received at the antenna 201 of receiver unit 200 via signal path 210*b* and received at antenna 203 of receiver unit 202 via signal path 210*a*. As such, the link may be defined by the reference tag 220 as the reference signal source, the receiver unit 200 and the receiver unit 202. If either of the receiver units 200 or 202 included an additional antenna, an additional link can be defined involving the additional antenna.

The link data for the link illustrated in FIG. 2 may be defined as the time stamp provided by the receiver 200 when the reference signal is received, and the time stamp provided by the receiver 202 when the reference signal is received. The link data may also include the known locations of the receiver units 200 and 202, for example, in the form of coordinates. Further, the link data may include the known location of the reference tag 220. Additionally, or alternatively, the link data may include the transmission time of the reference signal as provided by the reference tag 220. In some example embodiments, the reference tag 220 may alternatively be a receiver unit that provides the reference signal via an antenna. In this regard, the transmitting receiver unit may time stamp the time-of-transmission of the reference signal.

Figure 3:
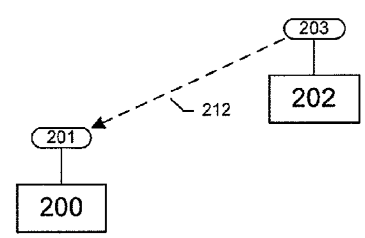

FIG. 3 illustrates a second type of link, where the reference signal source is also an antenna of the first or second receiver units that define the link. In this regard, the receiver unit 202 may be configured to transmit a reference signal, via the antenna 203 to the receiver 200 via the antenna 201. The signal may propagate via a signal path 212, which is a line-of-sight (LOS) path. The reference signal source is therefore the receiver unit 202 via antenna 203 and the first receiver unit to define the link. Rather than generating a time stamp for the time-of-arrival of the reference signal as described in FIG. 2, the receiver unit 202 generates a time stamp that is indicative of a time of transmission for the reference signal. In effect, this time of transmission is treated like the time-of-arrival of the signal at the antenna of the receiver unit 202. Therefore, the link data for the link illustrated in FIG. 3 may be defined as the time stamp of the transmission from the antenna 203 of receiver unit 202 and the time stamp provided by the receiver 200 when the reference signal is received by the antenna 201 of reference unit 200. The link data describing this link may also include the known locations of the receiver units 200 and 202, for example, in the form of coordinates.

Figure 4:
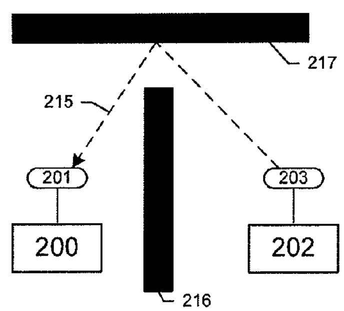

FIG. 4 illustrates yet another type of link that may be present within a wireless system, such as the locating system 100. The link illustrated in FIG. 4 is the same type of link as provided in FIG. 3, with the exception that the signal path 215 is a non-LOS path. In this regard, similar to FIG. 3, the receiver unit 202 may be configured to transmit a reference signal, via the antenna 203 to the receiver 200 via the antenna 201. The signal may propagate via a signal path 215 and bounce off of the barrier 217 to define a non-line-of-sight (non-LOS) path. The non-LOS path 215 may be a result of barrier 216 which may interfere with the LOS path. The reference signal source is therefore the receiver unit 202 via antenna 203 and the first receiver unit. Rather than generating a time stamp for the time-of-arrival of the reference signal as described in FIG. 2, the receiver unit 202 generates a time stamp that is indicative of a time of transmission for the reference signal. Therefore, the link data for the link illustrated in FIG. 4 may be defined as the time stamp of the transmission from the antenna 203 of receiver unit 202 and the time stamp provided by the receiver 200 when the reference signal is received by the antenna 201 of reference unit 200. The link data describing this link may also include the known locations of the receiver units 200 and 202, for example, in the form of coordinates.

Figure 5:
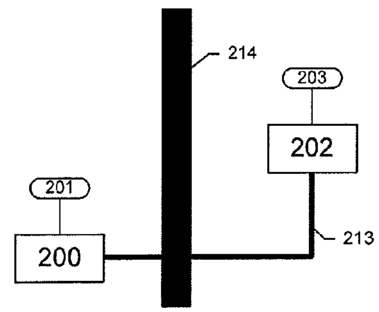

FIG. 5 illustrates yet another type of link that may be present within a wireless system, such as the locating system 100. The link illustrated in FIG. 5 is the same type of link as provided in FIG. 3, with the exception that the signal path 213 is along a wired connection between the receiver units 200 and 202. In this regard, similar to FIG. 3, the receiver unit 202 may be configured to transmit a reference signal, via the wired connection 213 to the receiver 200. The reference signal, possibly at baseband, may be transmitted from the receiver unit 202 to the receiver unit 200. Rather than generating a time stamp for the time-of-arrival of the reference signal as described in FIG. 2, the receiver unit 202 generates a time stamp that is indicative of a time of transmission for the reference signal from the receiver unit 202. Therefore, the link data for the link illustrated in FIG. 5 may be defined as the time stamp of the transmission from the receiver unit 202 and the time stamp provided by the receiver 200 when the reference signal is received by the reference unit 200. The link data describing this link may also include a known length of the wired connection 213. According to some example embodiments, the timing offset between the clocks of the receiver units that are party to a wired link may be considered constant, assuming that the wired connection is not broken or damaged.

In some example embodiments, the wired connection between the receiver units 200 and 202 may be a unidirectional wired link. The unidirectional connection may be configured to communicate a reference signal that contains a time stamp that is indicative of a time of transmission for the reference signal, such as from the receiver unit 202 to the receiver unit 200. In some unidirectional wired connection cases, a variable such as the wire length may be unknown to a receiver unit, as such, the receiver unit may require or otherwise obtain additional timing information via another connection, such as wireless connection of FIG. 3, to determine a timing relationship between receiver 200 and receiver 202. Alternatively or additionally, in an instance in which a bidirectional wired connection exists between receiver 200 and receiver 202, variables such as wire length may be solved for by the receiver 200 and receiver 202, for example by exchanging one or more signals.

Having described some of the various forms of links that can be considered by the time service of the location processing agent 150, an analysis of the various links in the system 100 may be performed to facilitate determining timing relationships between clocks. The dotted lines in FIG. 1 illustrate signal paths between the various antennas within the system. TABLE 1 provided below lists the various links that are included in the system 100 as depicted in FIG. 1

TABLE 1

Listing of Links

| Type of Link | Reference Signal Source - Receiver Unit/Antenna | $1^{st}$ Receiver Unit/ Antenna | $2^{nd}$ Receiver Unit/ Antenna | Reciprocal Path with Another Link? |
|---|---|---|---|---|
| Wireless - LOS | 110/111 | 110/111 | 112/113a | Y |
| Wireless - non-LOS | 110/111 | 110/111 | 114/115 | Y |
| Wireless - LOS | 112/113a | 112/113a | 110/111 | Y |
| Wireless - LOS | 112/113b | 112/113b | 114/115 | Y |
| Wireless - non-LOS | 114/115 | 114/115 | 110/111 | Y |
| Wireless - LOS | 116/117 | 116/117 | 118/119 | Y |
| Wireless - LOS | 118/119 | 118/119 | 116/117 | Y |
| Wireless - LOS | 118/119 | 118/119 | 120/121 | Y |
| Wireless - LOS | 120/121 | 120/121 | 118/119 | Y |
| Wired | 120 | 120 | 116 | Y |
| Wired | 116 | 116 | 120 | Y |
| Wireless - LOS | 122 | 112/113b | 116/117 | N |
| Wireless - LOS | 122 | 112/113b | 118/119 | N |
| Wireless - LOS | 122 | 116/117 | 118/119 | N |

As such, the time service may be configured to identify each of the links illustrated in FIG. 1 and listed TABLE 1. The time service may also be configured to repeatedly obtain link data associated with each of the links over a duration of time. For example, each of the reference signal sources may be configured to transmit a reference signal every 2 seconds. As such, over, for example, a 20 second window of time, the receiver units may be configured to capture time stamps (e.g., received or transmitted) associated with the various reference signals that are available in the system 100. The time service may be configured to aggregate the link data for all the links over the 20 second period of time and analyze the data to determine timing relationships between the clocks of the receiver units. Windows of link data (e.g. 20 second windows of data) may be continuously compiled by the time service to increase the amount of data that can be analyzed with respect to each link. By aggregating and analyzing the link data in this manner a reliability metric for each link may be developed.

According to various example embodiments, the location processing agent 150, via the time service, may be configured to determine a reliability metric for each link within the system 100. The reliability metric for a given link may be a function of the consistency of the received time-of-arrival of the reference signal for the link. In this regard, as link data for a given link is aggregated, a consistency or standard deviation for the time stamps for the link, relative to each other (e.g. each time stamp for the link), relative to a time-of-arrival difference predicated by a geometry, or relative to a system clock, may be generated. A link that has consistent relative time stamps or a small standard deviation may be assigned a value for a reliability metric indicating that the link is more reliable than a link that does not have consistent relative time stamps or has a larger standard deviation. For example, according to some example embodiments, a reliability metric may have a value between zero and one, where a value of one indicates that the link is very reliable and a value of zero indicates that the link is not reliable.

As more data for a link is obtained, the reliability metric for the link may adjusted. The reliability metric may be adjusted based on a variance of a predetermined signal-time-of-arrival relationship for the link and a signal-time-of-arrival relationship based on the link data describing a reference signal event for the link. In this regard, if additional data for the link is received that is consistent with the previously received data (e.g., the standard deviation stays the same or is reduced), then the reliability metric for link may be increased (or modified to indicate that the link is more reliable). However, if additional data for the link is received that is inconsistent with the previously received data (e.g., the standard deviation increases), then the reliability metric for the link may be reduced (or modified to indicate that the link is less reliable).

According to some example embodiments, the degree to which a reliability metric is modified may be different for indicating that the reliability metric is more reliable versus indicating that the reliability metric is less reliable. In this regard, if additional data for a link is consistent with previously received data (e.g., the standard deviation is the same or less), then the reliability metric may be increased by a given amount. However, if additional data for a link is inconsistent with previously received data (e.g., the standard deviation is greater), then the reliability metric may be decreased by relatively more than the given amount. For example, the reliability metric may be defined such that improvements in the reliability metric may be made based on a linear function, whereas declines in the reliability metric may be made based on an exponential function. In other words, a reliability metric may improve at a slower rate than the rate at which the reliability metric would decline. This treatment of the reliability metric may be used in situations where the movement of vehicles or other barriers into the signal path for a link may suddenly block the reference signal or only permit non-LOS reception of the reference signal. In these conditions, it may be advantageous to rapidly decline the reliability metric since such a decline may more closely represent the current reliability condition of the link.

However, according to some example embodiments, reliability metrics for a link may be increased by a relatively larger amount when another link with a reciprocal path is identified, thereby identifying reciprocal links. Reciprocal links may be a set of two links that use the same signal path between an antenna of a first receiver unit and an antenna of a second receiver unit, although the signal paths travel in opposite directions by originating at the destination of the other and ending at the origin of the other. In this regard, the location processing agent 150, via the time service, may be configured to identify links between an antenna of the first receiver unit and an antenna of a second receiver unit, where both to the antennas operate as the signal source of the links. In this regard, the location processing agent 150, via the time service, may analyze the aggregated link data to identify links that have reciprocal signal paths. In this regard, TABLE 1 identifies the links within the system 100 that have reciprocal signal paths. For example, the wireless LOS link from receiver unit 120/antenna 121 to receiver unit 118/antenna 119 is reciprocal to the wireless LOS link from the receiver unit 119/antenna 119 to receiver unit 120/antenna 121. A reciprocal link can be identified by analyzing the link data and determining that the time-of-arrival from an antenna of a first receiver unit to a second receiver unit is the same as the time-of-arrival from the antenna of the second receiver unit to the antenna of the first receiver unit. Since links that have reciprocal signal paths are likely to have relatively high reliability, the reliability metric for the links may be increased relatively more rapidly than for non-reciprocal links under the same circumstances. As such, the location processing agent 150 may be configured to determine that a link is one of a set of reciprocal links between antennas of different receiver units, where reciprocal links use the same signal path between the antennas but in opposite directions.

Additionally, according to some example embodiments, the location processing agent 150, via the time service, may be configured to generate a prediction of the time-of-arrival of a reference signal for a particular link. This prediction may be based upon the distance between a reference signal source and an antenna of a receiver unit using the known locations of the reference signal source and the antenna of the receiver unit. The predication of the time-of-arrival may then be compared to the actual time-of-arrival and the result may be used to determine whether the signal path of the reference signal is a LOS path or a non-LOS path. As such, this comparison may be used to determine whether reciprocal signal paths between antennas involve non-LOS signal paths. An example of a set of non-LOS reciprocal signal paths is included in FIG. 1 associated with the links between receiver unit 110/antenna 111 and receiver unit 114/antenna 115. The non-LOS characteristic of these links may occur as a result of the barriers 124 and 126. As described above, if the time-of-flight for a reference signal from an antenna of a first receiver unit to reach an antenna of a second receiver unit is the same as the time-of-flight for a reference signal from the antenna of the second receiver unit to the antenna of the first receiver unit, then it may be determined that the signal paths are reciprocal. As such, these non-LOS reciprocal links can also have respective reliability metrics, and since the non-LOS links are reciprocal, the links may be considered to be robust and improvements in the reliability metric for the link may be increased at a relatively faster rate than a link that is not part of a reciprocal link set.

To facilitate building a model of the timing relationships between the receiver units of the system 100, the location processing agent 150 may be configured to categorize the links as being either reliable links or unreliable links. To perform this categorization of the links, the reliability metrics of the links may be compared to a threshold reliability to identify those links that are reliable and meet or exceed (e.g., satisfy) the reliability threshold, and those links that are unreliable and fail to satisfy the reliability threshold.

According to various example embodiments, the reliability threshold may be set as a static value that defines a static level used to categorize the links. However, according to some example embodiments, the reliability threshold may be dynamically set. In this regard, the value for the reliability threshold may be based on a result of a holistic analysis of the reliability metrics for each of the plurality of links within the system 100. For example, the location processing agent 150 may be configured to determine the threshold and perform the comparisons in a single functional operation. In this regard, the location processing agent 150 may be configured to identify a group of links with relatively high reliability metrics by determining a mean or average for the group and disqualifying links form the group if their respective reliability metric indicates the link is less reliable and deviates from the mean of average by a threshold amount. As such, with the addition of more link data, the location processing agent 150 may be configured to continuously adjust the reliability threshold, thereby ensuring, according to some example embodiments, that any models of the timing relationships between the clocks of the receiver units consider only the reliable links.

According to some example embodiments, the topology of the system 100 may be considered with respect to the reliable links. However, due to the removal of unreliable links from consideration to generate a clock timing model for the system, due to the locations of the receiver units within the tracking area, and/or due to changes in the characteristics of the system (e.g., movement of a barrier such as truck), discontinuities in the topology of system may occur. The occurrence of topological discontinuities in the system 100 is illustrated in FIGS. 6*a* and 6*b*. In this regard, FIGS. 6*a* and 6*b* illustrate the topological maps of the system 100 based on the links that are illustrated in FIG. 1 and described above in TABLE 1. In FIG. 6*a*, all of the links from FIG. 1 are included. Note that the system topology of FIG. 6*a* does not include a discontinuity because, using the link data, relationships between each of the clocks of the various receiver units can be expressed relative to each other (i.e., a topologic path can be draw between any two receivers). As such, if a model of the clock timing relationships within the system as illustrated in FIG. 6*a* is generated, tracking equations for each of the receiver unit clocks can be generated in relation to each of the other clocks in the system.

However, in FIG. 6*b*, the link between receiver unit 112 and receiver unit 116, and the link between receiver unit 112 and receiver unit 118 are no longer available. These links may have been removed from the analysis because their reliability metrics were relatively poor (i.e., fell below the threshold) and therefore the links are no longer considered in the modeling analysis because the link data is unreliable. The removal of these links may occur as a result of the reference tag 122 failing, the movement of a barrier into the system (e.g., a truck has moved near the reference tag 122 and diminished its ability to successfully transmit reference signals, or the like). Regardless of the reason, the links are no longer available for the analysis and therefore a discontinuity is introduced to the system since each of the receiver units can no longer be described relative to each of the other receiver units (i.e., no topologic path exists between each of the receiver units), because no link bridges the receivers between the islands. In this situation, the system 100 has been segmented into a plurality of islands—island 600 and island 601. Since there is no link between these islands, the location processing agent, via the time service, may be configured to treat the islands as separate sub-systems and construct separate independent clock timing models for each of the islands. However, in the event that the link between receiver unit 112 and receiver unit 116, and/or the link between receiver unit 112 and receiver unit 118 are subsequently re-introduced to the analysis (e.g., due to an improvement in the reliability metrics of one or both links), the system may again be considered in its entirety without the inclusion of separate islands.

Accordingly, whether or not an islanding situation arises, the location processing agent 150 may be configured to generate a model describing the timing relationships between the clocks of the receiver units within the system based on the link data of the links that have been identified as being reliable. In some example embodiments, the location processing agent 150 may further be configured to weight link data of the links that have been identified as being reliable based on the reliability metric. For example, the weight may be used as a variance for a minimum mean square error determination. The model may be defined in terms of timing relationships between the clocks of the system based on determined differences in clock rates and differences in timing offsets. While these are two terms that may be considered when generating the model, it is contemplated that any number of other dimensional terms may be considered. The model may take the form of a collection of tracking equations. Each tracking equation may be associated with a respective receiver unit and its clock, and each tracking equation may describe a relationship between the receiver unit's clock and a system time (e.g. a clock of another receiver unit within the system, a time determined by the location processing agent 150, a global positioning system clock time, a system clock, a process time and/or the like). The tracking equations may also describe the difference in time (or the offset) between the various clocks in the system. Further, the model, possibly as defined by the equations, may be adjusted as new link data is received and analyzed.

Having generated the timing model, the model can then also be applied by the location processing agent 150. In this regard, the location processing agent 150 may be configured to utilize the timing model when determining a location of a mobile tag that is being tracked within the system. The model may be applied to time-of-arrival data captured by the receiver units and associated with a signal transmitted by the mobile tag to correct the time-of-arrival data for the unsynchronized clocks of the receiver units. Application of the model to the time-of-arrival data for the signal transmitted by the mobile tag may operate to make the clocks of the various receiver units appear to be synchronized. Further, the timing model may be applied to data about a signal received from a mobile tag to facilitate determining the location of the tag using techniques including but not limited to time of arrival (ToA) or time difference of arrival (TDoA), signal angle of arrival (AoA), signal magnitude such as received channel power indication (RCPI) or received signal strength indication (RSSI), range to signal source such as time of flight (ToF), two way ranging (TWR), symmetrical double sided two way ranging (SDS-TWR) or near field electromagnetic ranging (NFER), or the like; possibly used in combination.

As described above, various example embodiments facilitate the ability to dynamically evaluate the links within a system and modify the timing model to consider current system characteristics. This adaptive ability can, according to some embodiments, substantially reduce the complexities involved in the initial design of a system and can reduce or eliminate the need for continued redesign in a changing environment. Further, by leveraging an ability to consider non-LOS links, some example embodiments may reduce the need for additional receiver units or reference tags thereby reducing installation complexity and cost.

The description provided above and generally herein illustrates example methods, example apparatuses, and example computer program products for modeling timing relationships between clocks. FIG. 7 depicts an example apparatus configured to perform the various functionalities as described herein. In this regard, the apparatus 300 of FIG. 7 may be configured to operate as the location processing agent 150, described above. Additionally, FIG. 8 is a flowchart of an example method of the present invention that may be performed by, for example, the apparatus 300 to model timing relationships between clocks within a system.

Referring now to FIG. 7, an example embodiment of the present invention is depicted as apparatus 300. Apparatus 300 may, be embodied as, or included as a component of, a communications device with wired and/or wireless communications capabilities. The apparatus 300 may be embodied as any number of communications and computing devices such as, for example, a receiver as described above, a server, a computer, an access point, a printer, any combination of the aforementioned, or the like. Regardless of the type of communications device, apparatus 300 may also include computing capabilities.

The example apparatus 300 may include or be otherwise in communication with a processing circuitry 305, a memory device 310, an Input/Output (I/O) interface 306, a communications interface 315, a time service 340, and, in some example embodiments, a locating manger 341. The processing circuitry 305 may be embodied or include as various means for implementing the various functionalities of example embodiments of the present invention including, for example, a processor, a microprocessor, a coprocessor, a controller, a special-purpose integrated circuit such as, for example, an ASIC (application specific integrated circuit), an FPGA (field programmable gate array), or a hardware accelerator, or the like. Further, the processing circuitry 305 may be comprised of a plurality of transistors, logic gates, a clock (e.g., oscillator), other circuitry, and the like to facilitate performance of the functionality described herein. The processing circuitry 305 may, but need not, include one or more accompanying digital signal processors. In some example embodiments, the processing circuitry 305 is configured to execute instructions stored in the memory device 310 or instructions otherwise accessible to the processing circuitry 305. The processing circuitry 305 may be configured to operate such that the processor circuitry causes the apparatus 300 to perform the various functionalities described herein.

Whether configured as hardware or via instructions stored on a computer-readable storage medium, or by a combination thereof, the processing circuitry 305 may be an entity capable of performing operations according to embodiments of the present invention while configured accordingly. Thus, in example embodiments where the processing circuitry 305 is embodied as, or is part of, an ASIC, FPGA, or the like, the processing circuitry 305 is specifically configured hardware for conducting the operations described herein. Alternatively, in example embodiments where the processing circuitry 305 is embodied as an executor of instructions stored on a computer-readable storage medium, the instructions specifically configure the processing circuitry 305 to perform the algorithms and operations described herein. In some example embodiments, the processing circuitry 305 is a processor of a specific device (e.g., the location processing agent 150) configured for employing example embodiments of the present invention by further configuration of the processing circuitry 305 via executed instructions for performing the algorithms, methods, and operations described herein.

The memory device 310 may be one or more tangible and/or non-transitory computer-readable storage media that may include volatile and/or non-volatile memory. In some example embodiments, the memory device 310 includes Random Access Memory (RAM) including dynamic and/or static RAM, on-chip or off-chip cache memory, and/or the like. Further, memory device 310 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 310 may include a cache area for temporary storage of data. In this regard, some or all of memory device 310 may be included within the processing circuitry 305.

Further, the memory device 310 may be configured to store information, data, applications, computer-readable program code instructions, and/or the like for enabling the processing circuitry 305 and the example apparatus 300 to carry out various functions in accordance with example embodiments of the present invention described herein. For example, the memory device 310 could be configured to buffer input data for processing by the processing circuitry 305. Additionally, or alternatively, the memory device 310 may be configured to store instructions for execution by the processing circuitry 305.

The I/O interface 306 may be any device, circuitry, or means embodied in hardware, software, or a combination of hardware and software that is configured to interface the processing circuitry 305 with other circuitry or devices, such as the communications interface 315. In some example embodiments, the processing circuitry 305 may interface with the memory 310 via the I/O interface 306. The I/O interface 306 may be configured to convert signals and data into a form that may be interpreted by the processing circuitry 305. The I/O interface 306 may also perform buffering of inputs and outputs to support the operation of the processing circuitry 305. According to some example embodiments, the processing circuitry 305 and the I/O interface 306 may be combined onto a single chip or integrated circuit configured to perform, or cause the apparatus 300 to perform, various functionalities of the present invention. In some example embodiments, the apparatus 300 may be embodied as a single chip or chipset.

The communication interface 315 may be any device or means embodied in hardware, or a combination of hardware and software that is configured to receive and/or transmit data from/to a network 320 (e.g., the system 100) and/or any other device or module in communication with the example apparatus 300. In some example embodiments, the communication interface 315 may be configured to control or leverage other hardware (e.g., an antenna) to perform communications functionality. The communications interface may be configured to communicate information via any type of wired or wireless connection, and via any type of communications protocol, such as a protocols that may be used in asset locating systems or other protocols based on a bi-phase modulated technique. Processing circuitry 305 may also be configured to facilitate communications via the communications interface 315 by, for example, controlling hardware included within the communications interface 315. In this regard, the communication interface 315 may include or operate in conjunction with, for example, communications driver circuitry (e.g., circuitry that supports wired communications via, for example, fiber optic connections), one or more antennas, a transmitter module, a receiver module, a transceiver and/or supporting hardware, including, for example, a processor for enabling communications. Via the communication interface 315, the example apparatus 300 may communicate with various other network entities in a device-to-device fashion and/or via indirect communications via an access point, server, gateway, router, or the like.

The time service 340 and the locating manager 341 of example apparatus 300 may be any means or device embodied, partially or wholly, in hardware, a computer program product, a transitory or non-transitory computer readable medium or a combination of hardware and a computer program product, such as processing circuitry 305 implementing stored instructions to configure the example apparatus 300, memory device 310 storing executable program code instructions configured to carry out the functions described herein, or a hardware configured processing circuitry 305 that is configured to carry out the functions of the time service 340 and the locating manager 341 as described herein. In an example embodiment, the processing circuitry 305 includes, or controls, the time service 340 and the locating manager 341. The time service 340 and the locating manager 341 may be, partially or wholly, embodied as processors similar to, but separate from processing circuitry 305. In this regard, the time service 340 and the locating manager 341 may be in communication with the processing circuitry 305. In various example embodiments, the time service 340 and the locating manager 341 may, partially or wholly, reside on differing apparatuses such that some or all of the functionality of the time service 340 and the locating manager 341 may be performed by a first apparatus, and the remainder of the functionality of the time service 340 and the locating manager 341 may be performed by one or more other apparatuses.

The apparatus 300 and the processing circuitry 305 may be configured to perform the following functionality via the time service 340. In this regard, the time service 340 may be configured to cause or direct the processing circuitry 305 and/or the apparatus 300 to perform various functionalities with respect to modeling clock timing relationships, such as those described with respect to FIG. 8 and as generally described herein.

For example, with reference to FIG. 8, the time service 340 may be configured to identify a link that is one of a plurality of links within the wireless locating system at 400. The link may be defined by at least a reference signal source, a first receiver unit, and a second receiver unit. The time service 340 may also be configured to receive link data describing a reference signal event for the link at 410. In this regard, the link data for the reference signal event may be defined by at least a first time stamp describing a time at which the first receiver unit received a reference signal transmitted by the reference signal source, and a second time stamp associated with the reference signal (e.g., associated as a transmission time for the reference signal or a receipt time of the reference signal). In some example embodiments, the link data may be further defined by at least one of location coordinates for the first receiver unit, location coordinates for the second receiver unit, or location coordinates of the reference signal source. Further, at 420, the time service 340 may be configured to determine a reliability metric for the link based on the link data and compare the reliability metric for the link to a threshold reliability metric to determine whether the link is a reliable link at 430. Additionally, at 440, the time service 340 may be configured to include the link in a collection of reliable links for the wireless locating system, in an instance in which the link is determined to be a reliable link, and, at 450, generate a model describing a timing relationship between respective clocks of each of a plurality of receiver units in the wireless locating system based on link data for each of the reliable links.

The apparatus 300 and the processing circuitry 305 may be further configured to perform the following functionality via the locating manager 341. In this regard, the locating manager 341 may be configured to cause or direct the processing circuitry 305 and/or the apparatus 300 to perform various functionalities with respect to asset locating. The locating manager 341 may be configured to apply the model generated by the time service 340 to time-of-arrival data captured by at least some of the plurality of receiver units to correct the time-of-arrival data for unsynchronized clocks of the receiver units.

Additionally or alternatively, according to some example embodiments, the time service 340 may be configured identify the link between an antenna of the first receiver unit and an antenna of a second receiver unit, where the reference signal source is the antenna of the second receiver unit and the second time stamp is a time when the antenna of the second receiver unit transmitted the reference signal. According to some example embodiments, the time service 340 may be additionally or alternatively configured to determine a value of the threshold reliability based on a result of a holistic analysis of reliability metrics for each of the plurality of links within the wireless locating system. According to some example embodiments, the time service may be additionally or alternatively configured to determine the reliability metric by adjusting the reliability metric for the link based on a variance from a predetermined signal-time-of arrival relationship for the link and a signal-time-of-arrival relationship based on the link data describing the reference signal event for the link.

Further, according to some example embodiments, the time service 340 may be additionally or alternatively configured to generate the model by segmenting the model into a first island component and a second island component due to a topological discontinuity that occurs when no link bridges a receiver unit addressed by the first island component to a receiver unit addressed by the second island component. As such, the model may include independent timing relationships for the first island component and the second island component. Additionally or alternatively, the time service 340 may be configured to generate the model by generating the model as a collection of tracking equations, where each tracking equation is associated with a respective receiver unit and each tracking equation describes a relationship between a selected receiver unit clock and a system time. Additionally or alternatively, the time service 340 may be configured to determine the reliability metric by determining that the link is one of a set of reciprocal links between the antenna of the first receiver unit and the antenna of the second receiver unit, wherein the reciprocal links use the same signal path between the antenna of the first receiver unit and the antenna of the second receiver unit in opposite directions. Moreover, according to some additional embodiments, the signal path between the antenna of the first receiver unit and the antenna of the second receiver unit may be a non-line-of-sight path. Additionally or alternatively, the time service 340 may be configured to identify a second link, determine that the second link is a reciprocal of the link, wherein determining that the second link is the reciprocal includes determining that the second link uses the same signal path, referenced in an opposite direction, as the link based on time-of-arrival information, and adjust the reliability metric for the link based on the determination that the link has a reciprocal link.

FIG. 8 illustrates flowcharts of example systems, methods, computer program products, and/or transitory or non-transitory computer readable media according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of FIG. 8 and otherwise described herein may be stored on a memory device, such as memory device 310, of an example apparatus, such as example apparatus 300, and executed by processing circuitry, such as the processing circuitry 305. As will be appreciated, any such program code instructions may be loaded onto a computer or other programmable apparatus (e.g., processing circuitry 305, memory device 310, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claim. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claim. In this regard, for example, different combinations of elements and/or functions other than those explicitly described above are also contemplated as may be set forth in some of the appended claim. Although specific terms are employed herein, they are used in a generic and descriptive sense only and not for purposes of limitation.

What is claimed is:

1. A method comprising:

identifying a link that is one of a plurality of links within a wireless locating system, the link being defined by at least a reference signal source, a first receiver unit, and a second receiver unit;

receiving link data describing reference signal events for the link, the link data for the reference signal events being defined by at least first time stamps describing times at which the first receiver unit received reference signals transmitted by the reference signal source, and second time stamps associated with the reference signal;

determining, via a processor, a reliability metric for signal transmission via the link based on the link data, wherein determining the reliability metric comprises calculating a standard deviation of the first time stamps;

comparing, via the processor, the reliability metric for the link to a threshold reliability metric to determine whether the link is a reliable link;

in an instance in which the link is determined to be a reliable link, including the link in a collection of reliable links for the wireless locating system;

generating, via the processor, a model describing a timing relationship between respective clocks of each of a plurality of receiver units in the wireless locating system based on link data for each of the reliable links; and repeatedly applying, via the processor, the model to time-of-arrival data captured by at least some of the plurality of receiver units to correct the time-of-arrival data for unsynchronized clocks of the receiver units.

2. The method of claim 1, wherein the link data is further defined by at least one of location coordinates for the first receiver unit, location coordinates for the second receiver unit, or location coordinates of the reference signal source.

3. The method of claim 1, wherein at least one of the first receiver unit or the second receiver unit includes a plurality of antennas.

4. The method of claim 1, wherein identifying the link includes identifying the link between an antenna of the first receiver unit and an antenna of a second receiver unit, the reference signal source being the antenna of the second receiver unit and the second time stamps being times when the antenna of the second receiver unit transmitted the reference signal.

5. The method of claim 1 further comprising determining a value of the threshold reliability based on a result of a holistic analysis of reliability metrics for each of the plurality of links within the wireless locating system.

6. The method of claim 1, wherein generating a model describing a timing relationship comprises:

adjusting the timing relationship between respective clocks of each of a plurality of receiver units in the wireless locating system based on weight for each of the reliable links.

7. The method of claim 1, wherein determining the reliability metric for signal transmission via the link includes:

adjusting the reliability metric based on a variance from a predetermined signal-time-of-arrival relationship for the link and a signal-time-of-arrival relationship based on the link data describing the reference signal events for the link.

8. The method of claim 1, wherein calculating the standard deviation of the first time stamps comprises calculating the standard deviation relative to other ones of the first time stamps, a time-of-arrival difference predicated by a geometry or a system clock.

9. The method of claim 1, wherein generating the model includes:

segmenting the model into a first island component and a second island component due to a topological discontinuity that occurs when no link bridges a receiver unit addressed by the first island component to a receiver unit addressed by the second island component, wherein the model includes independent timing relationships for the first island component and the second island component.

10. The method of claim 1, wherein generating the model includes generating the model as a collection of tracking equations, wherein each tracking equation is associated with a respective receiver unit and each tracking equation describes a relationship between a selected receiver unit clock and a system time.

11. The method of claim 1, wherein identifying the link includes identifying the link between an antenna of the first receiver unit and an antenna of a second receiver unit, the reference signal source being the antenna of the second receiver unit and the second time stamps being times when the antenna of the second receiver unit transmitted the reference signals; and wherein determining the reliability metric includes determining that the link is one of a set of reciprocal links between the antenna of the first receiver unit and the antenna of the second receiver unit, wherein the reciprocal links use a same signal path between the antenna of the first receiver unit and the antenna of the second receiver unit in opposite directions.

12. The method of claim 11, wherein the signal path between the antenna of the first receiver unit and the antenna of the second receiver unit is a non-line-of-sight path.

13. The method of claim 1, wherein identifying the link includes identifying a wired link between the first receiver unit and the second receiver unit, the reference signal source being the second receiver unit and the second time stamps being times when the second receiver unit transmitted the reference signals.

14. The method of claim 13, wherein determining the reliability metric includes determining that the wired link is one of a set of reciprocal links between the first receiver unit and the second receiver unit and wherein the reciprocal links use a same signal path between the first receiver unit and the second receiver unit in opposite directions.

15. The method of claim 1, wherein the reference signal source of the link is a reference tag positioned at a predetermined location, the reference tag being configured to transmit a geographic identifier related to the predetermined location.

16. The method of claim 1, wherein determining the reliability metric for signal transmission via the link includes:

identifying a second link;

determining that the second link is a reciprocal of the link, wherein determining that the second link is the reciprocal includes determining that the second link uses the same signal path, referenced in an opposite direction, as the link based on time-of-arrival information; and adjusting the reliability metric for signal transmission via the link based on the determination that the link has a reciprocal link.

17. A non-transitory computer readable medium having program code stored thereon, that when executed causes an apparatus to:

identify a link that is one of a plurality of links within a wireless locating system, the link being defined by at least a reference signal source, a first receiver unit, and a second receiver unit;

receive link data describing reference signal events for the link, the link data for the reference signal events being defined by at least first time stamps describing times at which the first receiver unit received reference signals transmitted by the reference signal source, and second time stamps associated with the reference signal;

determine a reliability metric for signal transmission via the link based on the link data, wherein determining the reliability metric comprises calculating a standard deviation of the first time stamps;

compare the reliability metric for the link to a threshold reliability metric to determine whether the link is a reliable link;

in an instance in which the link is determined to be a reliable link, include the link in a collection of reliable links for the wireless locating system;

generate a model describing a timing relationship between respective clocks of each of a plurality of receiver units in the wireless locating system based on link data for each of the reliable links; and repeatedly apply the model to time-of-arrival data captured by at least some of the plurality of receiver units to correct the time-of-arrival data for unsynchronized clocks of the receiver units.

18. An apparatus comprising processing circuitry configured to at least:

identify a link that is one of a plurality of links within a wireless locating system, the link being defined by at least a reference signal source, a first receiver unit, and a second receiver unit;

receive link data describing reference signal events for the link, the link data for the reference signal events being defined by at least first time stamps describing times at which the first receiver unit received reference signals transmitted by the reference signal source, and second time stamps associated with the reference signal;

determine a reliability metric for signal transmission via the link based on the link data, wherein determining the reliability metric comprises calculating a standard deviation of the first time stamps;

compare the reliability metric for the link to a threshold reliability metric to determine whether the link is a reliable link;

include the link in a collection of reliable links for the wireless locating system in an instance in which the link is determined to be a reliable link;

generate a model describing a timing relationship between respective clocks of each of a plurality of receiver units in the wireless locating system based on link data for each of the reliable links; and repeatedly apply the model to time-of-arrival data captured by at least some of the plurality of receiver units to correct the time-of-arrival data for unsynchronized clocks of the receiver units.

19. The apparatus of claim 18, wherein the link data is further defined by at least one of location coordinates for the first receiver unit, location coordinates for the second receiver unit, or location coordinates of the reference signal source.

20. The apparatus of claim 18, wherein at least one of the first receiver unit or the second receiver unit includes a plurality of antennas.

21. The apparatus of claim 18, wherein the processing circuitry configured to identify the link includes being configured to identify the link between an antenna of the first receiver unit and an antenna of a second receiver unit, the reference signal source being the antenna of the second receiver unit and the second time stamps being times when the antenna of the second receiver unit transmitted the reference signals.

22. The apparatus of claim 18, wherein the processing circuitry is further configured to determine a value of the threshold reliability based on a result of a holistic analysis of reliability metrics for each of the plurality of links within the wireless locating system.

23. The apparatus of claim 18, wherein the processing circuitry is further configured to adjust the timing relationship between respective clocks of each of a plurality of receiver units in the wireless locating system based on weight for each of the reliable links.

24. The apparatus of claim 18, wherein the processing circuitry configured to determine the reliability metric for signal transmission via the link includes being configured to:

adjust the reliability metric based on a variance from a predetermined signal-time-of-arrival relationship for the link and a signal-time-of-arrival relationship based on the link data describing the reference signal events for the link.

25. The apparatus of claim 18, wherein the processing circuitry configured to calculate the standard deviation of the first time stamps by calculating the standard deviation relative to other ones of the first time stamps, a time-of-arrival difference predicated by a geometry or a system clock.

26. The apparatus of claim 18, wherein the processing circuitry configured to generate the model includes being configured to segment the model into a first island component and a second island component due to a topological discontinuity that occurs when no link bridges a receiver unit addressed by the first island component to a receiver unit addressed by the second island component, wherein the model includes independent timing relationships for the first island component and the second island component.

27. The apparatus of claim 18, wherein the processing circuitry configured to generate the model includes being configured to generate the model as a collection of tracking equations, wherein each tracking equation is associated with a respective receiver unit and each tracking equation describes a relationship between a selected receiver unit clock and a system time.

28. The apparatus of claim 18, wherein the processing circuitry configured to identify the link includes being configured to identify the link between an antenna of the first receiver unit and an antenna of a second receiver unit, the reference signal source being the antenna of the second receiver unit and the second time stamps being times when the antenna of the second receiver unit transmitted the reference signals; and wherein the processing circuitry configured to determine the reliability metric includes being configured to determine that the link is one of a set of reciprocal links between the antenna of the first receiver unit and the antenna of the second receiver unit, wherein the reciprocal links use a same signal path between the antenna of the first receiver unit and the antenna of the second receiver unit in opposite directions.

29. The apparatus of claim 28, wherein the signal path between the antenna of the first receiver unit and the antenna of the second receiver unit is a non-line-of-sight path.

30. The apparatus of claim of claim 18, wherein identifying the link includes identifying a wired link between the first receiver unit and the second receiver unit, the reference signal source being the second receiver unit and the second time stamps being times when the second receiver unit transmitted the reference signals.

31. The apparatus of claim 30, wherein determining the reliability metric includes determining that the wired link is one of a set of reciprocal links between the first receiver unit and the second receiver unit and wherein the reciprocal links use a same signal path between the first receiver unit and the second receiver unit in opposite directions.

32. The apparatus of claim 18, further comprising a communications interface configured to receive link data from the plurality of receiver units.

33. The apparatus claim 18, wherein the reference signal source of the link is a reference tag positioned at a predetermined location, the reference tag being configured to transmit a geographic identifier related to the predetermined location.

34. The apparatus claim 18, wherein the processing circuitry configured to determine the reliability metric for signal transmission via the link includes being configured to:

identify a second link;

determine that the second link is a reciprocal of the link, wherein determining that the second link is the reciprocal includes determining that the second link uses a same signal path, referenced in an opposite direction, as the link based on time-of-arrival information; and adjust the reliability metric based on the determination that the link has a reciprocal link.

35. A wireless locating system comprising:

a plurality of receiver units including a first receiver unit and a second receiver unit; and a location processing agent, the location processing agent configured to at least:

identify a link that is one of a plurality of links within the wireless locating system, the link being defined by at least a reference signal source, a first receiver unit, and a second receiver unit, the link being between an antenna of the first receiver unit and an antenna of a second receiver unit, the reference signal source being the antenna of the second receiver unit;

receive link data describing reference signal events for the link, the link data for the reference signal events being defined by at least first time stamps describing times at which the first receiver unit received reference signals transmitted by the reference signal source, and second time stamps associated with the reference signals;

determine a reliability metric for signal transmission via the link based on the link data by calculating a standard deviation of the first time stamps, wherein determining the reliability metric includes determining that the link is one of a set of reciprocal links between the antenna of the first receiver unit and the antenna of the second receiver unit, wherein the reciprocal links use a same signal path between the antenna of the first receiver unit and the antenna of the second receiver unit in opposite directions, wherein the signal path between the antenna of the first receiver unit and the antenna of the second receiver unit is a non-line-of-sight path;

compare the reliability metric for signal transmission via the link to a threshold reliability metric to determine whether the link is a reliable link;

in an instance in which the link is determined to be a reliable link, include the link in a collection of reliable links for the wireless locating system;

generate a model describing a timing relationship between respective clocks of each of a plurality of receiver units in the wireless locating system based on link data for each of the reliable links; and repeatedly apply the model to time-of-arrival data captured by at least some of the plurality of receiver units to correct the time-of-arrival data for unsynchronized clocks of the receiver units.

* * * * *